(12) United States Patent
Kreutz et al.

(10) Patent No.: US 10,343,707 B2
(45) Date of Patent: Jul. 9, 2019

(54) STEERING COLUMN FOR A MOTOR VEHICLE

(71) Applicants: THYSSENKRUPP PRESTA AG, Eschen (LI); thyssenkrupp AG, Essen (DE)

(72) Inventors: Daniel Kreutz, Feldkirch (AT); Sebastian Forte, Mauren (LI); Hieronymus Schnitzer, Gamprin (LI)

(73) Assignees: THYSSENKRUPP PRESTA AG, Eschen (LI); THYSSENKRUPP AG, Essen (DE)

(*) Notice: Subject to any disclaimer, the term of this patent is extended or adjusted under 35 U.S.C. 154(b) by 0 days.

(21) Appl. No.: 15/557,189

(22) PCT Filed: Feb. 17, 2016

(86) PCT No.: PCT/EP2016/053343
§ 371 (c)(1),
(2) Date: Sep. 11, 2017

(87) PCT Pub. No.: WO2016/146331
PCT Pub. Date: Sep. 22, 2016

(65) Prior Publication Data
US 2018/0037250 A1    Feb. 8, 2018

(30) Foreign Application Priority Data
Mar. 18, 2015    (DE) .......................... 10 2015 204 894

(51) Int. Cl.
*B62D 1/19*    (2006.01)
*B62D 1/184*   (2006.01)
*B62D 1/187*   (2006.01)

(52) U.S. Cl.
CPC ............. *B62D 1/184* (2013.01); *B62D 1/187* (2013.01); *B62D 1/192* (2013.01); *B62D 1/195* (2013.01)

(58) Field of Classification Search
CPC ........ B62D 1/184; B62D 1/187; B62D 1/192; B62D 1/195
See application file for complete search history.

(56) References Cited

U.S. PATENT DOCUMENTS 5,029,489 A *  7/1991  Burmeister ............ B62D 1/184
                                                   280/775
7,735,868 B2 * 6/2010  Ridgway ................ B62D 1/184
                                                   280/775
(Continued)

FOREIGN PATENT DOCUMENTS

CN      103303355 A    9/2013
DE      102008034807 B  10/2009
(Continued)

OTHER PUBLICATIONS

English Translation of International Search Report issued in PCT/EP2016/053343, dated May 4, 2016 (dated May 17, 2016).

*Primary Examiner* — Faye M Fleming
(74) *Attorney, Agent, or Firm* — thyssenkrupp North America, Inc.

(57) ABSTRACT

A steering column may include an adjustment unit with a steering spindle that is mounted rotatably about its longitudinal axis in a casing tube, a supporting unit that supports the adjustment unit, and a clamping device that controls movement between the adjustment unit and the supporting unit in a longitudinal direction. The clamping device may comprise an actuating element that interacts with a clamping mechanism for clamping the supporting unit to the adjustment unit. The clamping device may further comprise a locking part. In the securing position a form-fitting element of the locking (Continued)

part engages non-displaceably in the longitudinal direction with a form-fitting element of an engagement part connected to the adjustment unit. In the release position the form-fitting element of the locking part may be spaced apart from the form-fitting element of the engagement part to release the adjustment unit. The actuating element may be connected to a lifting mechanism separate from the clamping mechanism. The lifting mechanism may be connected to the locking part and may convert actuation of the actuating element into a working stroke of the locking part. The working stroke of the lifting mechanism is assignable independently of a clamping stroke of the clamping mechanism.

10 Claims, 5 Drawing Sheets

(56) References Cited

U.S. PATENT DOCUMENTS

| | | | | |
|---|---|---|---|---|
| 8,500,168 B2* | 8/2013 | Goulay | ............. | B62D 1/195 280/777 |
| 8,783,717 B2* | 7/2014 | Tinnin | ............. | B62D 1/195 280/777 |
| 9,545,943 B2* | 1/2017 | Sakuda | ............. | B62D 1/185 |
| 9,926,001 B2* | 3/2018 | Sawall | ............. | B62D 1/184 |
| 2010/0300236 A1 | 12/2010 | Goulay | | |
| 2010/0300238 A1 | 12/2010 | Ridgway et al. | | |
| 2011/0115206 A1 | 5/2011 | Sulser | | |
| 2011/0185839 A1* | 8/2011 | Inoue | ............. | B62D 1/184 74/493 |
| 2012/0125139 A1 | 5/2012 | Tinnin | | |
| 2012/0125140 A1 | 5/2012 | Ridgway | | |
| 2015/0314801 A1 | 11/2015 | Gstöhl | | |
| 2015/0367876 A1 | 12/2015 | Heitz | | |
| 2016/0121920 A1 | 5/2016 | Klepp | | |
| 2016/0244084 A1 | 8/2016 | Hahn | | |

FOREIGN PATENT DOCUMENTS

| | | |
|---|---|---|
| DE | 102010044795 A | 3/2012 |
| DE | 102011119154 A | 5/2012 |
| DE | 102012111890 B | 12/2013 |
| DE | 102012112890 B | 1/2014 |
| DE | 102013001442 B | 3/2014 |
| DE | 102013104958 B | 7/2014 |
| EP | 0772541 A | 5/1997 |
| EP | 2259957 A | 12/2010 |
| EP | 2998194 A | 3/2016 |
| WO | 9604162 A | 2/1996 |
| WO | 2009121386 A | 10/2009 |
| WO | 2015016312 A | 2/2015 |

* cited by examiner

STEERING COLUMN FOR A MOTOR VEHICLE

CROSS REFERENCE TO RELATED APPLICATIONS

This application is a U.S. National Stage Entry of International Patent Application Serial Number PCT/EP2016/053343, filed Feb. 17, 2016, which claims priority to German Patent Application No. DE 10 2015 204 894.2 filed Mar. 18, 2015 the entire contents of both of which are incorporated herein by reference.

FIELD

The present disclosure generally relates to steering columns, including steering columns for motor vehicles with separate energy absorption devices.

BACKGROUND

In order to adjust a steering wheel position to a sitting position of a driver of a motor vehicle, steering columns are known in various configurations in the prior art. Besides a vertical adjustment by adjusting a tilt of the steering column, the steering wheel arranged at a rear end of the steering spindle in such steering columns can be positioned by a length adjustment in a direction of the steering column's longitudinal axis in an interior of the vehicle.

In order to adjust the steering wheel position to the sitting position of the driver of a motor vehicle, such steering columns are known in various configurations in the prior art. Besides a vertical adjustment by adjusting the tilt of the steering column, the steering wheel arranged at the rear end of the steering spindle in such steering columns can be positioned by a length adjustment in the direction of the steering column's longitudinal axis in the interior of the vehicle.

The length adjustability is realized in that the adjustment unit, which comprises the steering spindle mounted rotatably in a casing tube, is movable telescopically in the longitudinal direction relative to the supporting unit, which forms a support for the steering column that is firmly connected to the body of the vehicle, and it can be secured by means of a releasable clamping device in various lengthwise positions, i.e. it is releasably securable. The clamping device, also known as a securing device, acts on the adjustment unit held by the supporting unit, so that in the opened state of the clamping device—also known as the release position or loose position—a displacement of the adjustment unit relative to the supporting unit in the longitudinal direction is possible, for adjusting the steering wheel position, and in the closed state—called the securing position or locking position—the adjustment unit is clamped to the supporting unit and the steering wheel position in normal operation is secured under the anticipated mechanical stresses.

A steering column of this kind is described in DE 10 2008 034 807 B3. The clamping device described here comprises a clamping mechanism with an actuating element designed as a clamping axle. A rotary movement of the clamping axle exerted via an operating lever is converted by the clamping mechanism into a clamping stroke, which exerts a force in the transverse direction on the supporting unit, so that the adjustment device mounted therein is firmly braced, comparable to the function of a clamp. In this way, a force locking of the adjustment unit in the longitudinal direction is achieved.

As an effective measure for improving passenger safety during a vehicle collision, a so-called crash or frontal impact of a vehicle, during which the driver is thrown at high speed against the steering wheel, it is known how to design the steering column to be collapsible in the longitudinal direction, even in the securing position of the clamping device, when a large force is exerted on the steering wheel, greater than a limit value, which only occurs during a crash. In order to provide a controlled braking of a body impacting on the steering wheel, an energy absorption device is coupled between the supporting unit and the adjustment unit, which in normal operation are secured and clamped together by the clamping device as described, but in a crash are pushed together relative to each other. This converts the introduced kinetic energy into a plastic deformation of an energy absorption element, for example by breaking a tearing tab or bending an elongate long bending element, such as a bending wire or a bending strip, or by widening an oblong hole by means of a bolt or by stretching a sheet metal strip or by slicing off a shaving with a plane.

The activating of the energy absorption device (crash device) in known steering columns occurs by the clamping device when securing the adjustment unit. Specifically, for the crash activation, a locking part mounted on the supporting unit immovably in the longitudinal direction is likewise moved with the clamping stroke of the clamping device and is brought into form-fitting engagement with a form-fitting element, preferably a serration, with a corresponding form-fitting element, i.e. preferably a corresponding serration, of an engagement part. The engagement part is connected by an energy absorption device to the adjustment unit, which is not stressed during normal operation, i.e. it forms a rigid connection between supporting unit and adjustment unit. In the event of a crash, however, so great a force is applied to the adjustment unit that the adjustment unit and the supporting unit move in the longitudinal direction toward each other, whereupon the energy absorption element is deformed and thereby brakes the movement. The form-fitting connection between the locking part and the engagement part ensures that the fixed end of the energy absorption device can be securely braced by the engagement part against the supporting unit. In other words, in the event of a crash the form-fitting connection between the locking part and the engagement part remains intact, so that the energy absorption occurs in the energy absorption device, which is designed separately and functionally independent of the locking device. For the movement of the steering column, the clamping device is placed in the release position, whereupon on the one hand the clamping of the adjustment unit in the supporting unit is released and on the other hand the locking part is lifted by the reversed clamping stroke so much from the engagement part that the form-fitting elements get out of engagement and after an adjustment to a different position occurs they can be connected once again.

The crash activation upon actuation of the clamping device affords substantial additional safety to the vehicle passengers. However, it is a drawback of the prior art that the clamping stroke of the clamping device must be at least large enough so that a secure engaging and separating of the form-fitting elements of locking part and engagement part occurs during the locking and releasing, even though the clamping of the adjustment unit requires a smaller clamping stroke or even no clamping stroke, but only a clamping force. This restricts the design of the clamping device in terms of the clamping stroke and force transmission during the manual locking of the clamping device, when the functionality of the crash device needs to be assured.

From US 2010/0300236 A1 there is known a steering column with an energy absorption device. The energy absorption here, unlike the aforementioned DE 10 2008 034 807 B3, is supposed to occur in the clamping device itself in that the engagement part in the event of a crash slips through relative to the locking part, i.e. the form-fitting connection between the locking part and the engagement part is broken. The drawback here, however, is that the serration actually provided for the locking may produce an abrupt and hard to control energy absorption, which is therefore unsuitable in practice.

Thus a need exists to provide a steering column with a clamping device and a separate energy absorption device that offers improved possibilities of crash activation and that overcomes the dependency on a clamping stroke of a clamping device.

DETAILED DESCRIPTION

Figure 1:
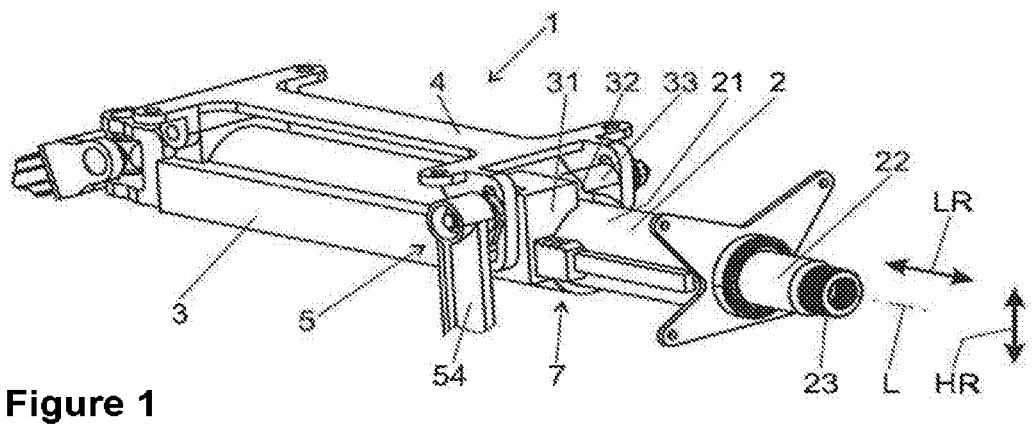
FIG. 1 is a schematic perspective view of an example steering column.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

To solve the problems of the prior art, an actuating element of a steering column may be connected to a lifting mechanism that is separate from a clamping mechanism, which is connected to the locking part and which converts an actuation of the actuating element into a working stroke of the locking part relative to the engagement part. A working stroke of the lifting mechanism may be assignable independently of the clamping stroke of the clamping mechanism.

More generally, the present disclosure generally involves steering columns for motor vehicles. In some examples, a steering column may comprise an adjustment unit with a steering spindle that is mounted rotatably about its longitudinal axis in a casing tube, a supporting unit that is connectible to the body of the motor vehicle and in which the adjustment unit can be accommodated, and a clamping device that in a securing position secures the adjustment unit relative to the supporting unit in normal operation and that releases a movement of the adjustment unit relative to the supporting unit in at least a longitudinal direction. The clamping device may comprise an actuating element that interacts with a clamping mechanism that converts an actuation of the actuating element into a clamping stroke that is directed transversely to the longitudinal axis for clamping the supporting unit to the adjustment unit. The clamping device may comprise at least one locking part that is supported in the longitudinal direction on the supporting unit. In the securing position a form-fitting element of the locking part may engage non-displaceably in the longitudinal direction with a form-fitting element of an engagement part connected to the adjustment unit, and in the release position the form-fitting element of the locking part may be spaced apart from the form-fitting element of the engagement part, and releases a movement of the adjustment unit relative to the supporting unit in the longitudinal direction. The engagement part may be connected by an energy absorption device to the adjustment unit.

According to the invention, the crash activation occurs, as in the prior art, by an actuation of the clamping device, for example by means of a locking lever mounted on the actuating element or by means of an electromechanical drive mechanism coupled to the actuation element. A clamping mechanism which can be driven by the actuating element ensures a clamping of the adjustment unit in the supporting unit, as described. Furthermore, an additional lifting mechanism is provided, which can likewise be driven by the actuating element, but converts a movement of the actuating element into a lifting movement independently of the clamping mechanism, namely into the working stroke of the locking part relative to the engagement part, which is utilized to bring the form-fitting elements on the locking and engagement parts into engagement with each other, or out of engagement. By the clamping mechanism being "independent" with respect to the lifting mechanism it is meant that these can be designed structurally independently of each other, without mutually influencing the properties of the clamping mechanism and the properties of the lifting mechanism. Thus, the working stroke can be designed independently of the clamping stroke, so that there is a corresponding design freedom. In a single steering column according to the invention, the clamping mechanism and the lifting mechanism can be geared together by means of the actuating element so that the clamping stroke is not performed separately from the working stroke, because the clamping mechanism and the lifting mechanism can be driven by the actuating element.

Because the invention provides a special lifting mechanism for the crash activation, the movement of the locking part can be made independent of the clamping movement of the clamping mechanism and an optimized movement sequence can be realized. Thus, for example, it is conceivable and possible with the clamping mechanism to assign a relatively small clamping stroke with relatively large clamping force, and to ensure by a corresponding transmission ratio of the lifting mechanism that the working stroke is larger than the clamping stroke for the same movement of the actuating element. In this way, it can be ensured that even deep-shaped form-fitting elements on the locking and engagement parts, requiring a relatively large working stroke for a complete form-fitting engagement or a complete separation from each other, are joined together securely and firmly for the crash activation, and during the releasing of the locking device they are moved so far apart that the form-fitting elements are totally disengaged and a movement of the adjustment unit in the supporting unit is easily possible.

An important aspect of the invention is that the locking device and the energy absorption device represent separate components, each of which has its own different function. By optional releasing or locking of the locking device by means of the clamping device, the adjustment unit can be released from the supporting unit or braced with it, i.e. secured, while in the securing position or locking position the adjustment unit is braced with the supporting unit and the steering wheel position in normal driving operation is secured under the anticipated mechanical stresses. Consequently, the locking device serves for enabling the movement of the steering column. In the locked condition, the energy absorption device, being separate from the locking device, is coupled between the adjustment unit and the supporting unit. This has no influence on the movement of the steering column, but only serves for the energy absorption in the event of a crash, since the relative fixation between engagement part and locking part remains intact and unchanged by the locking device.

The lifting mechanism used can in theory be any kind of gearing which is able to convert a movement of the actuating element, which is carried out for the actuation of the clamping device to secure and release the steering column, into a lifting movement of the locking part.

In one preferred embodiment, the clamping mechanism is designed as a tilting pin clamping mechanism, a wedge disk and cam clamping mechanism, or a roller and linkage clamping mechanism. Such clamping mechanism are sufficiently known from the prior art.

One advantageous embodiment calls for the working stroke of the lifting mechanism to be oriented transversely to the clamping stroke of the clamping mechanism. By "transversely" is also meant a deviation by a spatial angle of as much as ±10°. This produces a greater design freedom in regard to the arrangement of locking and engagement parts. For example, it is conceivable to arrange the energy absorption device on the side of the adjustment unit, so that the movement of the locking part occurs roughly tangential to the adjustment unit. Because the movement of the locking part no longer occurs in the same direction as the clamping stroke of the clamping device, it is possible to better utilize the available structural space.

Preferably the actuating element is designed as a clamping axle, also known as a clamping shaft, which extends transversely to the longitudinal direction and which can rotate about its axis for the actuation of the clamping device, and on which a radially projecting cam is arranged in rotationally fixed manner, and wherein the locking part comprises a coupling section with at least one control face situated parallel to the clamping axle, with which the cam contour of the cam can be brought into operative engagement. By "parallel" is likewise meant a deviation at a spatial angle of as much as ±10°. In this embodiment, the lifting mechanism is designed as a cam mechanism, in which a cam protruding eccentrically from the clamping axle can be moved by a section of its cam path (cam contour) encircling the outside of the clamping axle against a control face connected to the locking part by rotation of the clamping axle. Upon rotation of the clamping axle, the eccentric portion of the cam exerts a force perpendicular to the clamping axle against the control face, so that the locking part executes a working stroke, namely a translatory movement transversely to the clamping axle. Preferably, only a translatory movement in one direction is performed. Such a cam mechanism is robust, reliable, and can be implemented with little expense. Furthermore, the shape of the cam contour can dictate a movement profile with different force/distance ratio at different sections for the locking part to travel upon rotation of the clamping axle. For example, it can be provided that the locking part during the locking process is at first moved quickly against the engagement part, and is then secured more slowly and with larger force applied. Other kinds of lifting mechanisms with levers, tilting pins, sliding or rolling bodies or the like can likewise be used to adapt to the circumstances of the particular application.

One advantageous embodiment of the invention calls for at least one control face being designed as a lifting surface, whose surface normal points in the direction of engagement of the form-fitting elements on the locking part and the engagement part. The surface normal of the lifting surface may be directed at the engagement part, in other words, the lifting surface is oriented parallel to the form-fitting elements on the locking part. Preferably, the direction of engagement corresponds to the direction of movement of the locking part which brings it into and out of engagement with the form-fitting elements of the engagement part. Preferably, the surface normal of the control face is oriented substantially perpendicular to the serration, meaning perpendicular in relation to a plane which is formed by the contact points between the serration of the locking part and the engagement part. By "substantially perpendicular" is meant a deviation in a spatial angle of as much as ±10°. Now, if the cam exerts a force on the lifting surface, the locking part will be lifted from the engagement part. Upon actuation of the clamping axle, the locking part will be moved away from the engagement part until the form-fitting elements are completely out of engagement and a relative movement of the supporting unit and the adjustment unit can be performed. A corresponding working stroke can easily be realized by the cam mechanism according to the invention.

Another advantageous embodiment of the invention calls for at least one control face being designed as a pressing surface, whose surface normal points contrary to the direction of engagement of the form-fitting elements on the locking part and the engagement part. This means that the surface normal, also known as the positive normal vector, of the lifting surface is directed away from the engagement part, in other words, the pressing surface is formed on an opposite side of the locking part in relation to the form-fitting elements. Now, if the cam exerts a force on the pressing surface, the locking part will be moved against the engagement part. Upon actuation of the clamping axle to secure the steering column, the locking part will be moved against the engagement part until the form-fitting elements are completely engaging with each other and the crash device is coupled through the engagement part and the locking part in form-fitting manner in the flow of force in the longitudinal direction between the adjustment unit and the supporting unit. A sufficient working stroke for this crash activation can easily be realized by the cam mechanism according to the invention.

Especially advantageous is a combination of a lifting surface and a pressing surface formed on a locking part. In this way, it is possible to realize with the cam a forced guidance of the locking part upon rotation of the clamping axle, i.e. the locking part has force actively applied to it during both the locking and the releasing of the lifting mechanism. The lifting surface and the pressing surface in effect form the inner surfaces of a switching fork, which is moved by the cam arranged between them in the direction of or against the direction of the working stroke. This ensures that, on the one hand, the form fit is securely closed for the crash activation, and on the other hand the form-fitting elements are distinctly separated from one another for the movement of the steering column, in particular, any jamming or snagging is prevented.

An advantageous modification of the invention provides that a spring element is arranged between the cam contour of a cam and a control face. The spring element can be designed as a compression spring, providing a resilient coupling of the cam to the respective control face. This means that, when the cam contour is moved in the direction toward the control face, a force is exerted by the spring element against the control face. The force increases accordingly as the spring between the cam contour and the control face is biased or compressed more strongly. In other words, the cam via the spring will exert a control force on the control face before the cam touches the control face, i.e. the control face leads the cam contour by the possible spring travel of the biased spring. In this way, it is possible, with the control face serving as the pressing surface, to press the locking part with its form-fitting elements in resilient flexible manner against the form-fitting elements on the engagement part. If a "tooth on tooth" situation should occur, during which a projecting segment of the one form-fitting element impinges exactly against a likewise projecting segment of the opposite form-fitting element and does not engage with form fit in a neighboring form-fitting indentation, the movement of the cam and thus the actuating element can continue until it reaches the securing position, during which at first only the spring element will be compressed. The locking part so biased by the spring element will be moved slightly from the blocked situation already by slight vibrations during operation, such as occur when starting the vehicle engine or driving away, and then engages automatically in form fit by its form-fitting element in the opposite form-fitting element under the influence of the spring force. For this, the available spring travel of the spring element will be dimensioned so that the cam can be moved in a "tooth on tooth" situation up to the end stop, i.e. the cam in the final position can be placed in the securing position. This effectively ensures that a driver when securing the steering column can at all times fully close the operating lever of the actuating element or the electromechanical drive mechanism when securing the steering column of the actuating element and thus the crash activation is securely accomplished. Otherwise, with a blocking actuating element, there would be the danger of causing damage by a forceful actuation, or the steering column is not securely fixed and the crash device is not activated, which should be avoided in all cases.

Furthermore, the spring element can equalize the play between the cam contour and the control faces when the cam is shifted between the locking position and the release position. In this way, unwanted noise production can be reduced.

In one preferred embodiment, the spring element is formed as a leaf spring, spiral spring or plate spring.

It is furthermore advantageous that a guide is formed on the supporting unit, in which guide the locking part is displaceably guided in the direction of the engagement part. The guide can be designed as a guide groove or rail, enabling a guided movement of the locking part relative to the engagement part. Furthermore, the guide can form a form-fitting seat in which the locking part is securely braced against the supporting unit in the event of a crash. The firm bracing of the locking part is especially important, since in the event of a crash the entire momentum of a body striking the steering wheel will be transmitted by the engagement part to the locking part and channeled from the latter into the supporting unit. This can be assured by the guide.

Preferably at least one contact surface of the guide which interacts with the locking part has a surface roughness Rz less than or equal to 10 μm. Thanks to this surface roughness, an optimal movement of the locking part in the guide can be assured.

Preferably the form-fitting elements are configured as serrations. Accordingly, the locking part can be designed as a tooth block with a serration on the side facing the engagement part, and the engagement part as a rack or toothed plate with a corresponding opposite serration on the side facing the locking part. The serrations have teeth running transversely to the longitudinal axis, preferably with pointed tooth profiles. This ensures that the above-described "tooth on tooth" situation on the one hand seldom occurs, and on the other hand is released by the slightest shaking, so that the teeth slide into each other with form fit. One advantageous modification calls for teeth with a sawtooth cross section, the teeth pointing toward each other like barbs with respect to the relative movement in the event of a crash. This ensures that the form-fitting elements even under an extreme loading in the longitudinal direction will not lift off from each other.

In one preferred modification, the engagement part and/or the locking part are/is formed as a sintered part. Thanks to the forming as a sintered part by means of a sintering process, the engagement part and/or the locking part can be produced in simple and economical manner.

The form-fitting elements on the engagement part can be fashioned as plates and oriented parallel to the clamping axle and parallel to the longitudinal axis. For example, the form-fitting elements can be designed as a tooth plate, corresponding to a segment of a rack with which the locking part, designed as a tooth block with corresponding serration, can engage. By "parallel" is likewise meant a deviation at a spatial angle of up to ±10°.

Figure 2:
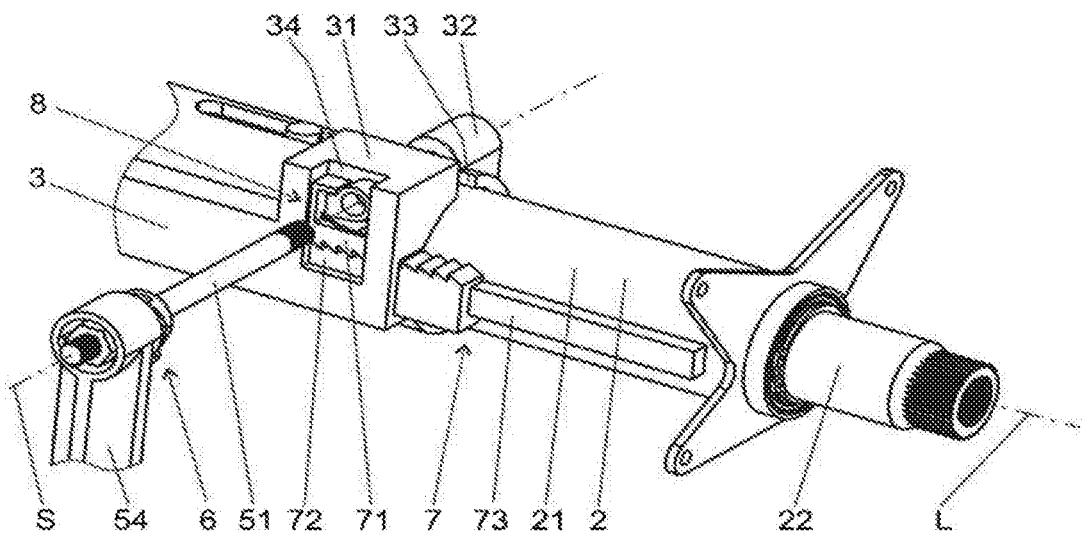
FIG. 2 is a detail view of the steering column of FIG. 1 in a partly disassembled state.
Figure 3:
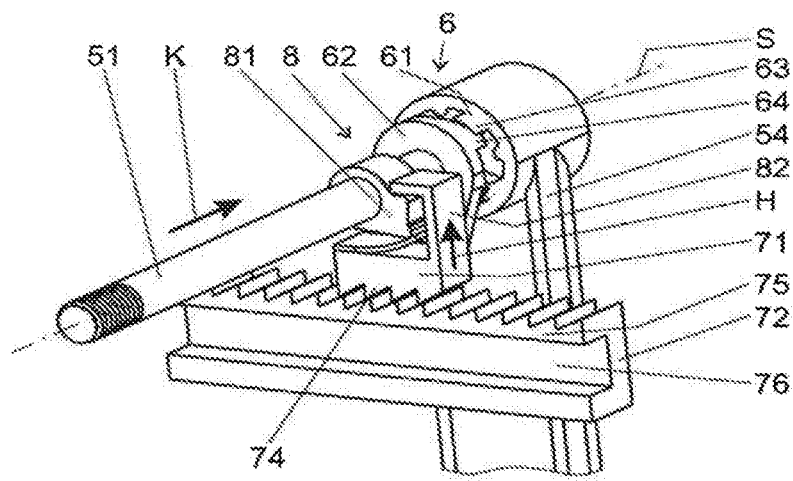
FIG. 3 is a partial detail view of the steering column of FIG. 2.

FIGS. 1 to 3 show a steering column 1, comprising an adjustment unit 2, with a casing tube 21, in which a steering spindle 22 is mounted to be rotatable about the longitudinal axis L. At a rear section 23 of the steering spindle 22 in regard to the driving direction, a steering wheel (not shown) can be attached.

The adjustment unit 2 is held in a supporting unit 3, which in turn is fastened to a bracket unit 4, which can be arranged on a body of a motor vehicle, not shown.

The supporting unit 3 comprises a recess in which the adjustment unit 2 is received, while the supporting unit 3 comprises side sections 31 and 32, between which a slot 33 extends in the direction of the longitudinal axis L and on which a clamping force can be exerted by a clamping device 5 transversely to the longitudinal axis L, by which these can be pressed toward each other and thus make the slot 33 narrower. In this way, the casing tube 21 of the adjustment unit 2 arranged in the supporting unit 3 can be tightened in the closed position (securing position) of the clamping device 5 in the supporting unit 3, while in the loosened position (release position) the supporting unit 3 does not exert any clamping force on the casing tube 21, so that the adjustment unit 2 can move in the direction of the longitudinal axis L, i.e. in the longitudinal direction LR, for the adjusting of the steering wheel position. Preferably, a movement of the steering wheel position can also occur in the vertical direction HR.

The clamping device 5 comprises, as its actuating element, a clamping axle 51, which can turn about its axis of rotation S in the oppositely situated side pieces 31, 32 of the supporting unit 3. On the clamping axle 51 is mounted a clamping lever 54, fixed in rotation, for the manual rotation of the clamping axle 51.

The clamping axle 51 interacts with a clamping mechanism 6, which is clearly recognizable in the representation of FIG. 3, showing a view with respect to the axis of rotation S in the opposite direction from FIG. 2, while the side pieces 31, 32 have been left out for better visibility. In the embodiment shown, the clamping mechanism 6 comprises a first cam disk 61 connected firmly to the clamping lever 54 and the clamping axle 51 and a second cam disk 62 connected to the side piece 31 of the supporting unit 3. The cam disks 61 and 62 have axially oppositely directed cams 63 and 64, sliding against each other. For the fixation of the adjustment unit 2, the clamping axle 51 is turned by means of the clamping lever 54 so that the cams 63 and 64 from a release position in which a cam 63, 64 of one cam disk 61, 62 engages in an indentation between the cams 64, 63 of the other cam disk 62, 61 to a securing position in which the cams 63, 64 lie axially against one another by their elevations. In this way, a clamping stroke K is exerted on the clamping axle 51, in the representation of FIG. 3, as indicated by the arrow K. The clamping axle 51 is braced against an abutment (not shown) on the side piece 32, so that the clamping stroke K transmits a clamping force to the supporting unit 3, by which the side pieces 31 and 32 are pressed against the casing tube 21 lying between them and the adjustment unit 2 is fixed in the supporting unit 3 with respect to a displacement in the longitudinal direction LR.

As to the size of the clamping stroke K, it should be noted that this can in theory be close to zero if the supporting unit 3 is already in contact with and embracing the casing tube 21 of the adjustment unit 2, so that the clamping only requires an increasing of the clamping force on the side pieces 31 and 32, with the latter moving to a slight extent toward the casing tube 21. In practice, however, due to the unavoidable elastic deformations of the supporting unit 3 and the clamping device 5, a minimal clamping stroke K will always occur, and this may lie in the range of 0.5 mm to 4.2 mm.

The crash device 7 comprises a locking part 71 in the form of a tooth block 71 and an engagement part 72 in the form of a tooth plate 72. The engagement part 72 configured as the tooth plate 72 is connected by an energy absorption device 73 to the casing tube 21 of the adjustment unit 2 and has form-fitting elements configured as a serration 75 on one side surface, which is oriented parallel to the longitudinal axis L and parallel to the axis of rotation S. The tooth block 71 has a corresponding serration 74, opposite the serration 75, which can engage in form fit in the serration 75. Preferably, the teeth 741, 751 of the serrations 74, 75 have a sawtooth cross section.

The tooth block 71 is mounted displaceably in a guide 34 on the supporting unit 3 in the lifting direction H, which is oriented perpendicular to the longitudinal axis L and to the axis of rotation S. The serrations 74 and 75 are moved apart from each other upon movement in the lifting direction H, i.e. they are detached, and upon movement contrary to the lifting direction H they are brought together in engagement, i.e. connected in form fit.

The movement of the tooth block 71 occurs by means of a lifting mechanism 8, which is activated by the clamping axle 51. For this, a radially projecting cam 81 is arranged on the clamping axle 51 in rotationally fixed manner. As can be seen from FIG. 3 and especially from the lateral cross section views of FIGS. 4 to 6, a coupling section 82 is formed on the tooth block 71, having one control face designed as a lifting surface 83 and one as a pressing surface 84. The pressing surface 84 is formed on a back side opposite the serration 74, i.e. its surface normal points away from the serration 74, while the lifting surface 83 is oriented parallel to the serration 74, i.e. its surface normal points toward the serration 75. Between the lifting surface 83 and the pressing surface 84 is arranged the cam 81, so that the cam contour can be brought into contact with the lifting surface 83 and the pressing surface 84.

Between the pressing surface 71 and the cam 81 there is arranged a leaf spring 85 as the spring element.

The function of the lifting mechanism 8 shall be explained below with the aid of FIGS. 4, 5 and 6.

Figure 4:
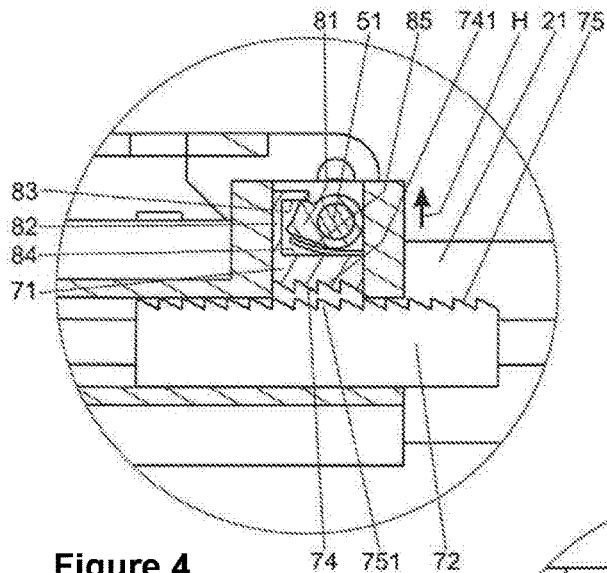
FIG. 4 is a cross-sectional view of a lifting device of an example steering column in an open state.

FIG. 4 shows the loosened position or release position, in which the serration 74 of the tooth block 71 is lifted off entirely from the serration 75 of the tooth plate 72 in the lifting direction H, i.e. it is detached, so that the crash device 7 is deactivated. This release position of the lifting mechanism 8 at the same time corresponds to the release position of the clamping mechanism 6, so that the adjustment unit 2 can be moved relative to the supporting unit 3 in the longitudinal direction LR.

If the clamping axle 51 is rotated counterclockwise in the representation shown, the cam moves away from the lifting surface 83 and toward the pressing surface 84. The cam contour acts on the leaf spring 85, which is compressed and exerts a force against the lifting direction H on the pressing surface 71. In other words, the movement of the cam contour is transmitted via the leaf spring 85 to the tooth block 71. In this way, the tooth block 71 moves in the guide 34 in the direction of the tooth plate 72, until the closed position (also known as the securing position or locking position) shown in FIG. 5 is reached. The path from the open position to the securing position defines the working stroke of the lifting mechanism 8.

Figure 5:
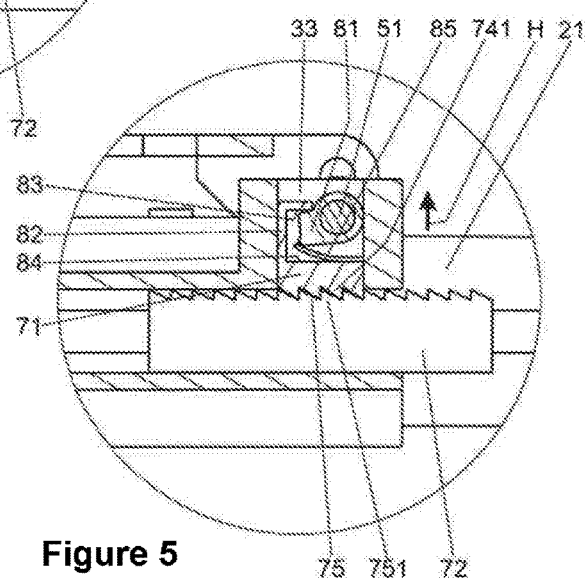
FIG. 5 is a cross-sectional view of the lifting device of the steering column of FIG. 4 in a closed state.

In the securing position shown in FIG. 5, the serrations 74 and 75 of the tooth plate 72 and the tooth block 71 engage with each other in form fit. The tooth block 71 is pressed by the leaf spring 85 against the tooth plate 72, so that the crash device 7 is coupled to the supporting unit 3 and thus activated. In the event of a crash, the tooth plate 72 is pushed in the longitudinal direction LR indicated by the arrow (to the left in the drawing), whereupon the sawtoothed profiles of the teeth 751 and 741 are braced against each other by their steep flanks, so that no forces are exerted in the lifting direction H on the serrations 75, 74. Consequently, the crash device 7 is reliably active. In the event of a crash, the adjustment unit 2 moves relative to the supporting unit 3, and in the course of the relative movement the energy produced by the driver of the vehicle is absorbed in controlled manner. For this, the tooth plate 72 has a longitudinal groove 76, in which the energy absorption device 73 is received with more than enough room. Thanks to this excess room, the energy introduced in the event of a crash during relative displacement between the energy absorption device 73, secured to the adjustment unit 2, and the tooth plate 72 is dissipated. Furthermore, it is possible and conceivable, alternatively or in addition to at least one bending wire or strip 221, to also couple other energy absorption mechanisms to the tooth plate 72, such as tearing tabs, oblong holes widened by means of a pin, or combined bending and tearing tabs.

Figure 6:
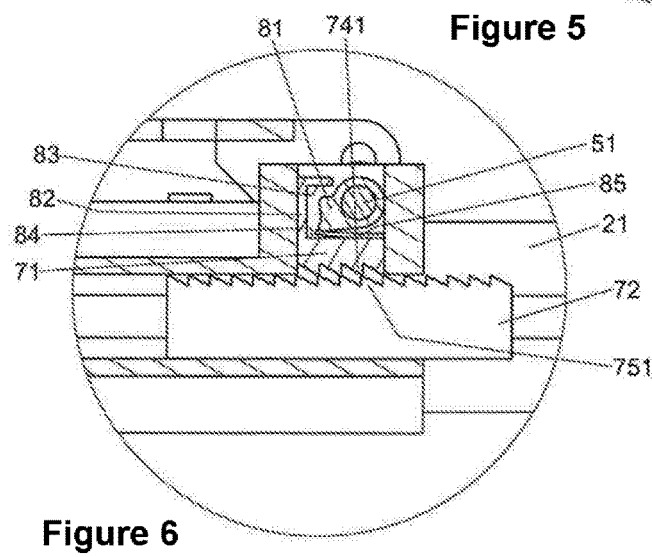
FIG. 6 is a cross-sectional view of the lifting device of the steering column of FIG. 4 in a tooth-on-tooth situation.

FIG. 6 shows the special case in which the serrations 74 and 75 during the fixation by movement of the tooth block 71 contrary to the lifting direction H impinge on each other by the tips of the teeth 741 and 751 and at first do not lock as in FIG. 5, which corresponds to a "tooth on tooth" situation. It will be noticed that the cam 81 is nevertheless in its position corresponding to the securing position, as in FIG. 5. However, on account of the blocked movement of the tooth block 71, the leaf spring 85 is more heavily compressed between the cam contour and the pressing surface 84, so that an increased pressure is exerted on the unstably mounted tooth block 71 in this situation. Consequently, a slight shaking or vibration is enough to make the tooth tips slide apart and snap the serrations 74 and 75 under spring loading into the correct position according to FIG. 5.

In this way, the driver when securing the steering column can in any case move the clamping lever 54 to its end stop, while the clamping axle 51 achieves the position according to FIG. 5 or 6, even if the movement of the tooth block 71 is temporarily interrupted by a "tooth on tooth" situation. Even so, it is still guaranteed that the crash activation occurs reliably.

For the adjustment of the steering wheel, the clamping axle 51 is turned in the opposite direction by actuation of the clamping lever 54. This turns the cam 81 in the clockwise direction and its cam contour touches the lifting surface 83, so that the tooth block 71 is moved from the securing position shown in FIG. 5 by the working stroke of the lifting mechanism 8 and thus brought into the release position shown in FIG. 4. The working stroke is designed by appropriate configuration of the cam 81 so that the teeth 741, 751 of the tooth plate 72 and the tooth block 71 are brought securely and entirely out of engagement and are detached from each other. The lifting movement of the tooth block 71 by the cam 81 occurs under constraint, i.e. the cam 81 by the actuation of the clamping axle 51 actively exerts a lifting force on the tooth block 71, so that the tooth block 71 is securely released, even if its mobility is impeded by sticking or jamming.

FIGS. 7 to 10 represent an alternative embodiment of the energy absorption with a crash activation according to the invention. The steering column here has a similar structural layout to the steering column from FIGS. 1 and 2.

In this alternative embodiment, the clamping mechanism 601 comprises a first cam disk 611 connected firmly to the clamping lever 541 and the clamping axle 511 and a second cam disk 621 connected to the side piece of the supporting unit. The cam disks 611 and 621 have axially oppositely directed cams 631 and 641, sliding against each other. For the fixation of the adjustment unit 201, the clamping axle 511 is turned by means of the clamping lever 541 so that the cams 631 and 641 from a release position in which a cam 631, 641 of one cam disk 611, 621 engages in an indentation between the cams 641, 631 of the other cam disk 621, 611 to a securing position in which the cams 631, 641 lie axially against one another by their elevations. In this way, a clamping stroke K is exerted on the clamping axle 511, in the representation of FIG. 7, as indicated by the arrow K.

Figure 7:
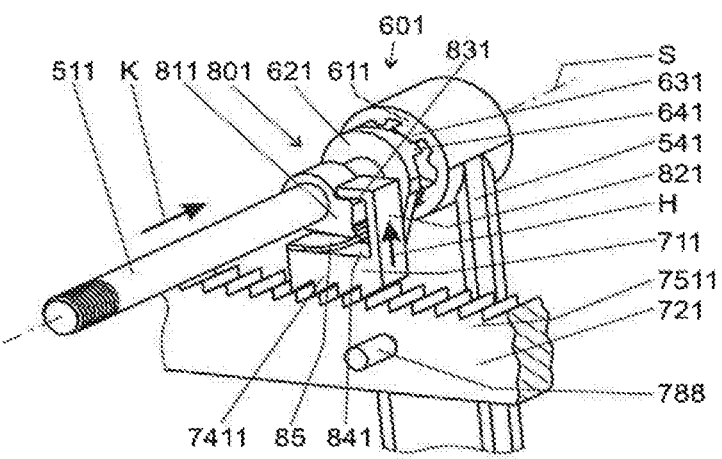
FIG. 7 is a partial detail view of another example steering column.
Figure 8:
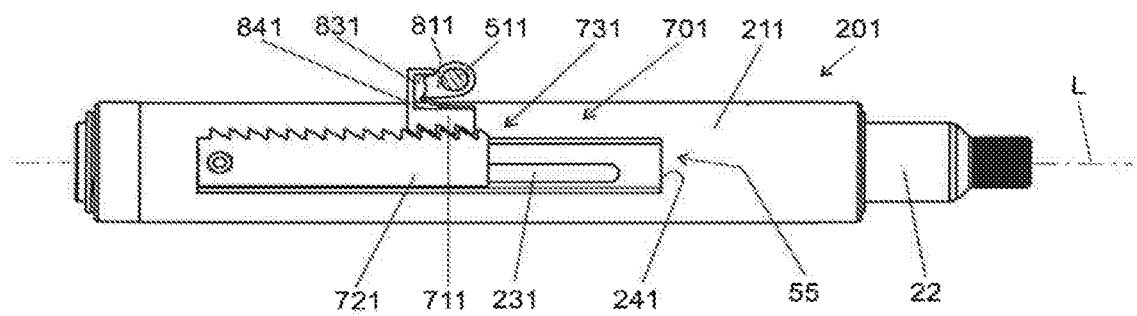
FIG. 8 is a side view of an example adjustment unit for a steering column with schematically depicted crash activation according to FIG. 7.
Figure 9:
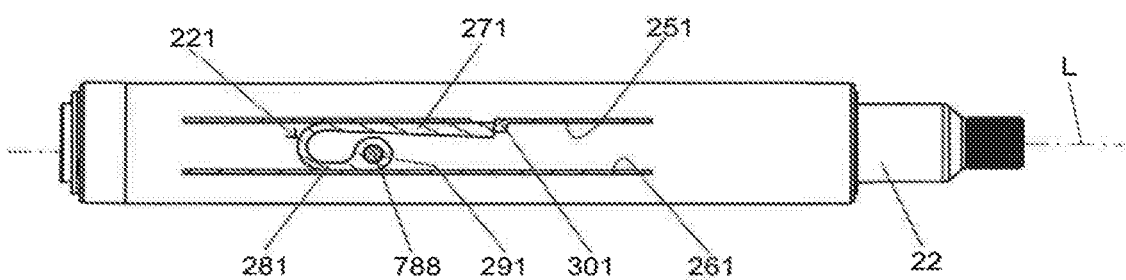
FIG. 9 is a longitudinal cross-sectional view of the adjustment unit before a crash according to FIG. 8.
Figure 10:
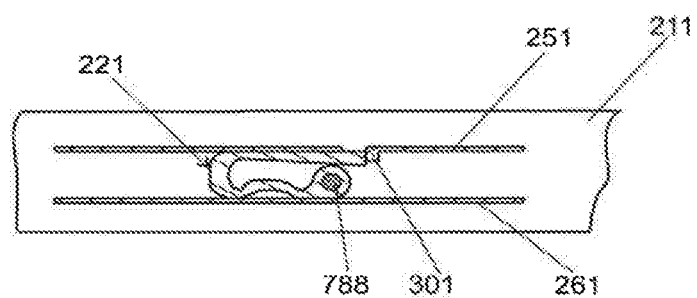
FIG. 10 is a longitudinal cross-sectional view of the adjustment unit according to FIG. 8 after a crash.

FIG. 7 shows the loosened position or release position, in which the serration 7511 of the tooth block 711 is lifted off entirely from the serration 7411 of the tooth plate 721 in the lifting direction H, i.e. it is detached, so that the crash device 701 is deactivated. This release position of the lifting mechanism 801 at the same time corresponds to the release position of the clamping mechanism 601, so that the adjustment unit 201 can be moved relative to the supporting unit in the longitudinal direction LR.

The lifting mechanism 801 of FIG. 7 according to the invention is identical in function to the lifting mechanism 8 in FIGS. 3 to 6.

The crash device 701 comprises the locking part 711 in the form of a tooth block 711 and the engagement part 721 in the form of the tooth plate 721. The tooth plate 721 is connected by an energy absorption device 731 to the casing tube 211 and has form-fitting elements configured as a serration 7511 on one side surface, which is oriented parallel to the longitudinal axis L and parallel to the axis of rotation S. The tooth block 711 has a corresponding serration 7411, opposite the serration 7511, which can engage in form fit in the serration 7511. Preferably, the teeth of the serrations 7411, 7511 have a sawtooth cross section. The tooth plate 711 comprises a driver 788 extending parallel to the axis of rotation S and facing the casing tube 211.

The tooth plate 721 is connected to a bending wire or strip 221, which is arranged in a housing, which is formed by the rail 55 having a U-shaped cross section in conjunction with a section of the casing tube 211. For this, the engagement part 721 has the driver 788, formed by a pin, which protrudes through a slot 231 in the wall 241 of the rail 55. The slot 231 extends in the direction of the longitudinal axis L. The rail in addition to the wall 241 comprises one side leg 251 and one side leg 261, each of these side legs 251, 261 being substantially parallel to the longitudinal axis L and to the axis of rotation S. By "substantially parallel" is meant a deviation in a spatial angle of as much as ±10°.

The flow of force in the event of a crash occurs from the tooth block 711 across the serrations 7411, 7511 to the tooth plate 721, and from the latter across the driver 788, standing off transversely to the serration direction. The driver 788 projects from the tooth plate 721 to the side, and thus transversely to the direction of movement H of the tooth block 711, and extends transversely to the longitudinal axis L through the slot 231. In this direction, it engages by form fit in the borehole 291 in the bending strip 221, so that in the event of a crash a force transmission occurs parallel to the longitudinal axis L.

By the driver 788 sticking through this slot 231, the engagement part 721 can be further displaced in the longitudinal direction LR of the adjustment unit 201 away from it. It is also conceivable and possible to arrange the driver on the bending wire or strip 221. The displaceable guiding of the engagement part 721 by the adjustment unit 2 can also be done in a way other than the one shown.

The bending wire or strip 221 has legs 271, 281 joined by a bend of 180°, which extend substantially in the direction of the longitudinal axis L. The two legs 271, 281 lie against opposite sides of the housing, namely against the inner surfaces of the side legs 251, 261 of the rail 55. The rolling bending radius of the bending wire or strip 221 upon its deformation, especially during the progressive bending in the event of a crash, is in this way limited and dictated.

For the connecting of the tooth plate 721 to the bending wire or strip 221, the pin-shaped driver 788 protrudes through a borehole 291 in the leg 281. Other connections of the tooth plate 721 to the bending wire or strip 221 are conceivable and possible.

The other leg 271 of the bending wire or strip 221 which is not connected to the tooth plate 721 abuts against an end stop 301 of the rail 55, by which it is carried along during a displacement of the adjustment unit 201 with respect to the supporting unit in the direction of the longitudinal axis L. Other connections of the leg 271 to the housing in which the bending wire or strip 221 is arranged in order to carry along the leg 271 in the event of a crash in the direction of the longitudinal axis L are conceivable and possible.

If a force exceeding a limit value is acting in the direction of the longitudinal axis L (=a crash), the adjustment unit 201 will be displaced in the direction of the longitudinal axis L relative to the supporting unit, which is firmly joined to the vehicle (in a direction pointing toward the front of the vehicle), whereupon telescoping sections of the steering spindle 22 are pushed into one another and the adjustment unit 201 is displaced relative to the tooth plate 721 held by the tooth block 711 and in this process the bending wire or strip 221 is deformed. This deformation involves in particular a change in the position of the bend between the legs 271, 281. Thanks to this plastic deformation of the bending wire or strip 221, energy is absorbed.

In the exemplary embodiment shown, the thickness of the leg 271 increases toward its free end, for example in the manner of a wedge. In this way, and because the bending wire or strip 221 is clamped between the side walls of the housing formed by the side legs 251, 261, under increasing displacement of the adjustment unit 201 relative to the supporting unit of the steering column the section 281 (in the region where the borehole 291 is provided) finally runs against the thickening region of the leg 271, resulting in additional work of deformation by compression.

Thanks to the geometrical configuration of the bending wire or strip 221, a desired characteristic can be accomplished for the energy dissipation. For this, the cross section of the leg 271 can have a predefined course along its length in relation to its area and/or in relation to its contour.

Figure 11:
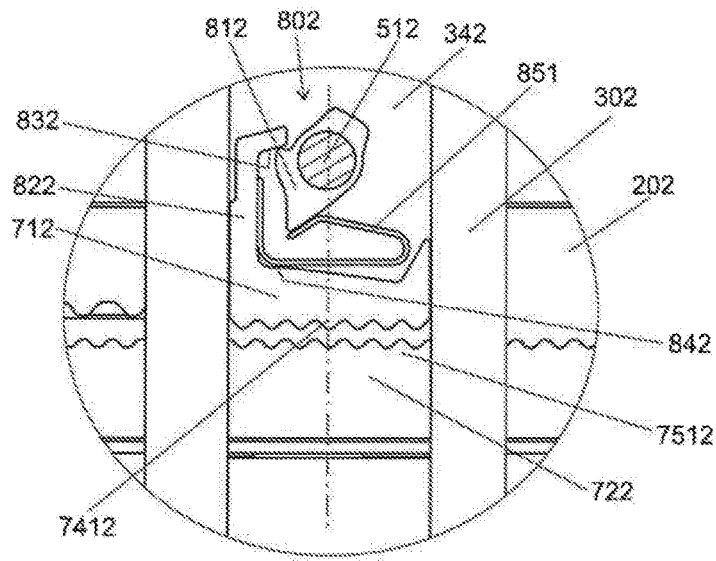
FIG. 11 is a cross-sectional view of another example lifting device in an open state.
Figure 12:
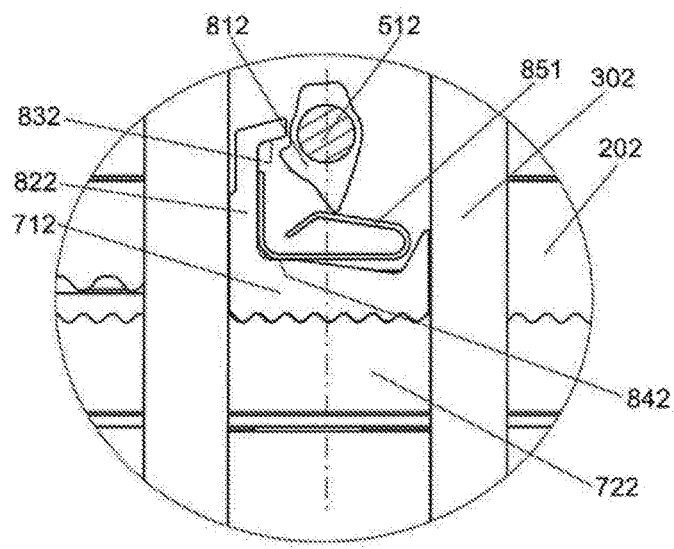
FIG. 12 is a cross-sectional view of the lifting device according to FIG. 11 in a closed state.

FIGS. 11 and 12 show an alternative embodiment of the lifting mechanism. FIG. 11 shows the lifting mechanism 802 in the open state, so that the adjustment unit 202 can be displaced relative to the supporting unit 302. FIG. 12 shows the lifting mechanism 802 in the closed state, so that the adjustment unit 202 is secured relative to the supporting unit 302.

The movement of the tooth block 712 occurs by means of the lifting mechanism 802, which is activated by the clamping axle 512. For this, a radially projecting cam 812 is arranged on the clamping axle 512 in rotationally fixed manner. As can be seen from FIG. 11, a coupling section 822 is formed on the tooth block 712, having one control face designed as a lifting surface 832 and one as a pressing surface 842. The pressing surface 842 is formed on a back side opposite the serration 7412. Between the lifting surface 832 and the pressing surface 842 is arranged the cam 812, so that the cam contour can be brought into contact with the lifting surface 832 and the pressing surface 842. The cam 812, when moved from the open to the closed position, crosses the bottom dead center, in other words, the cam 812 at first moves up to the tooth block 712 and at the same time biases the spring element 851, until the latter passes the bottom dead center and then the spring element 851 relaxes once more, but in the closed state it still stands under a bias force, as can be seen in FIG. 12. The cam 812 is inclined so that the spring element 851 applies a force to the cam 812 in the closing direction, in other words, the spring element 851 presses the cam 812 into the closed position.

A major advantage of the lifting mechanism 8, 801, 802 according to the invention is that the working stroke for the crash activation can be dictated independently of the clamping stroke of the clamping mechanism 6, 601, so that an optimized actuation can be accomplished for the adjustment unit 2, 201, 202 and the crash device 7, 701.

Figure 13:
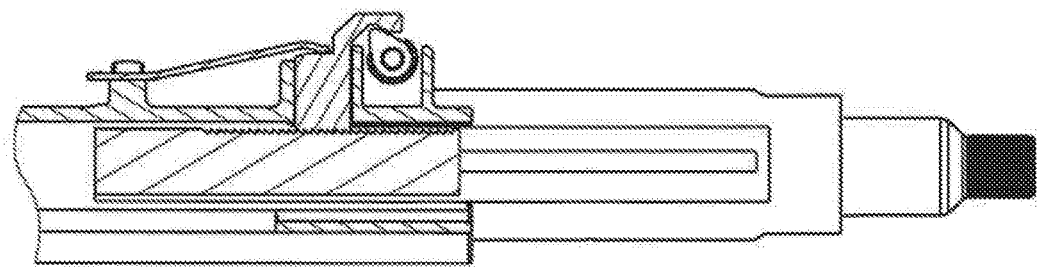
FIG. 13 is a cross-sectional view of yet another example lifting device in a closed state.
Figure 14:
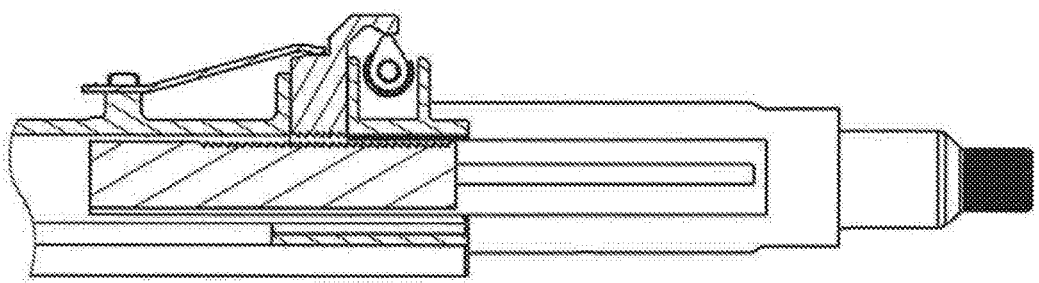
FIG. 14 is a cross-sectional view of the lifting device according to FIG. 13 in an open state.

FIG. 13 and FIG. 14 show another alternative embodiment of the lifting device in closed and open state. This embodiment is in principle similar to the construction of the embodiment shown in FIG. 12 and FIG. 11. In contrast with the latter, however, no spring element 851 is arranged between the cam 812 and the tooth block 712. Instead, a spring element 852, in the represented example being designed as a leaf spring, is fastened by its fixed end 8521 to the supporting unit 302 and presses with its free end 8522 the tooth block 712 contrary to the lifting direction H against the tooth plate 722, so that they engage with each other in form fit by their serrations 7412 and 7512.

The last shown embodiment furthermore has the benefit of more structural space being available for the spring element 852. Accordingly, the spring characteristic can be adapted in a broad range, so that the tooth block 712 in every operating state is pressed with sufficient and constant spring force against the tooth plate 722, and thus a secure form-fitting connection is assured. Furthermore, this arrangement is especially installation-friendly: with the clamping axle 512 already assembled, the tooth block 712 can simply be installed in the supporting unit 312, and then the spring element 852 can be fastened to the supporting unit 302.

LIST OF REFERENCE SYMBOLS

1 Steering column
2, 201, 202 Adjustment unit
21, 211 Casing tube
22 Steering spindle
221 Bending strip/bending wire
23 Section
231 Slot
241 Wall
251, 261 Side leg
271, 281 Leg
291 Borehole
3, 302 Supporting unit
301 End stop
31, 32 Side sections
33 Slot
34, 342 Guide
4 Bracket unit
5 Clamping device
51, 511, 512 Clamping axle
54, 541 Clamping lever
55 Rail
6, 601 Clamping mechanism
61, 62, 611, 621 Cam disk
63, 64, 631, 641 Cam
7, 701 Crash mechanism
71, 711, 712 Tooth block (locking part)
72, 721, 722 Tooth plate (engagement part)
73, 731 Energy absorption device 74, 75, 7411, 7412, 7511, 7512 Serrations (form-fitting elements)
741, 751 Teeth
76 Longitudinal groove
788 Driver
8, 801, 802 Lifting mechanism
81, 811, 812 Cam
82, 821, 822 Coupling section
83, 831, 832 Lifting surface
84, 841, 842 Pressing surface
85, 851, 852 Leaf spring (spring element)
8521 Free end
8522 Free end
K Clamping stroke
L Longitudinal axis
S Axis of rotation
H Lifting direction
LR Longitudinal direction

What is claimed is:

1. A steering column for a motor vehicle comprising:
an adjustment unit with a steering spindle that is mounted rotatably in a casing tube so as to be rotatable about a longitudinal axis of the steering spindle;
a supporting unit that is connectable to a body of the motor vehicle, wherein the adjustment unit is configured to be accommodated in the supporting unit;
a clamping device, wherein in a securing position the clamping device secures the adjustment unit relative to the supporting unit in normal operation, wherein in a release position the clamping device permits movement of the adjustment unit relative to the supporting unit at least in a longitudinal direction, the clamping device comprising:
an actuating element that interacts with a clamping mechanism that converts an actuation of the actuating element into a clamping stroke directed transversely to the longitudinal axis for clamping the supporting unit to the adjustment unit, and
a locking part that is supported in the longitudinal direction on the supporting unit, wherein in the securing position a form-fitting element of the locking part engages non-displaceably in the longitudinal direction with a form-fitting element of an engagement part connected to the adjustment unit, wherein in the release position the form-fitting element of the locking part is spaced apart from the form-fitting element of the engagement part, thereby permitting movement of the adjustment unit relative to the supporting unit in the longitudinal direction;
an energy absorption device that connects the engagement part to the adjustment unit; and
a lifting mechanism that is connected to the actuating element and is separate from the clamping mechanism, wherein the lifting mechanism is connected to the locking part and converts the actuation of the actuating element into a working stroke of the locking part relative to the engagement part, wherein the working stroke of the lifting mechanism is assignable independently of the clamping stroke of the clamping mechanism.

2. The steering column of claim 1 wherein the working stroke of the lifting mechanism is oriented transversely to the clamping stroke of the clamping mechanism.

3. The steering column of claim 1 wherein the actuating element is configured as a clamping axle that extends transversely to the longitudinal direction and is rotatable about an axis of the clamping axle for the actuation of the clamping device, wherein a radially projecting cam is disposed on the clamping axle in a rotationally-fixed manner, wherein the locking part comprises a coupling section with a control face positioned parallel to the clamping axle, wherein a cam contour of a cam is configured to operatively engage with the control face of the coupling section of the locking part.

4. The steering column of claim 3 further comprising a spring element disposed between the cam contour of the cam and the control face of the coupling section of the locking part.

5. The steering column of claim 3 wherein the form-fitting element of the engagement part is configured as a plate and is oriented parallel to the axis of the clamping axle and parallel to the longitudinal axis.

6. The steering column of claim 3 wherein the control face is configured as a lifting surface, wherein a surface normal of the lifting surface points in a direction of engagement of the form-fitting elements of the locking part and of the engagement part.

7. The steering column of claim 3 wherein the control face is configured as a pressing surface, wherein a surface normal of the pressing surface points in a direction contrary to engagement of the form-fitting elements of the locking part and of the engagement part.

8. The steering column of claim 1 further comprising a spring element disposed between a cam contour of a cam and a control face.

9. The steering column of claim 1 further comprising a guide formed on the supporting unit, wherein the locking part is displaceably guided in the guide in a direction of the engagement part.

10. The steering column of claim 1 wherein the form-fitting elements are configured as serrations.

* * * * *